Nov. 9, 1948.                    A. N. PIGG                    2,453,640
              VALVE ACTUATION FOR OSCILLATING CYLINDER
Filed Sept. 12, 1947    EXPANSIBLE CHAMBER MOTORS
                                                          2 Sheets-Sheet 1
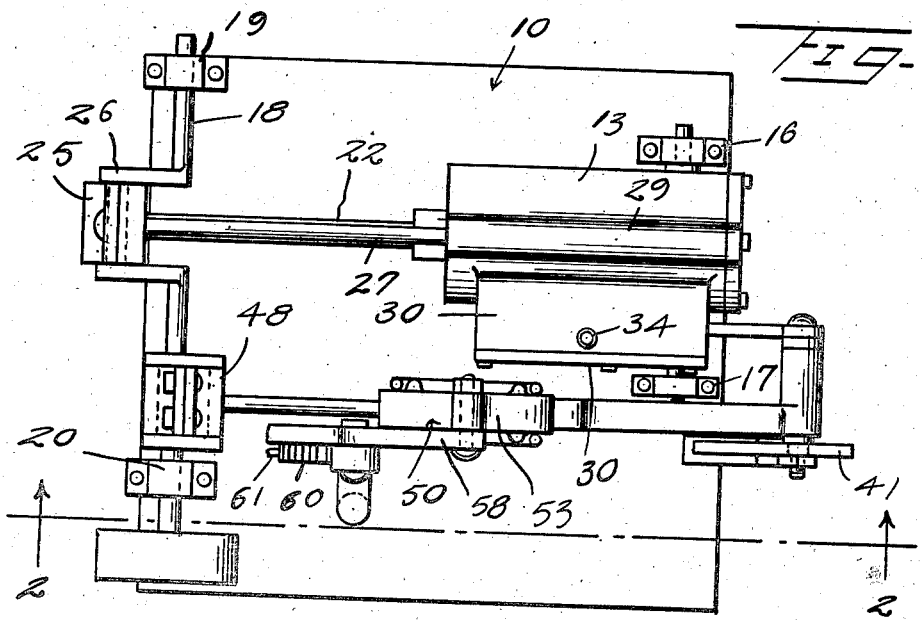
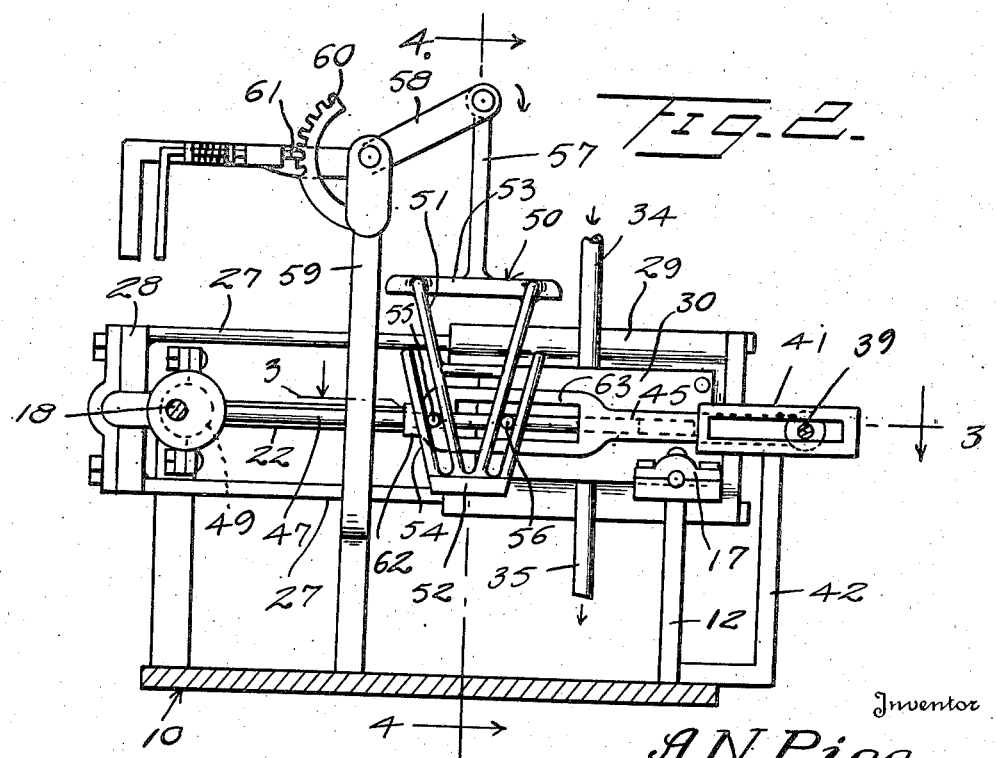
Inventor
A. N. Pigg
By Kimmel & Crowell
Attorneys

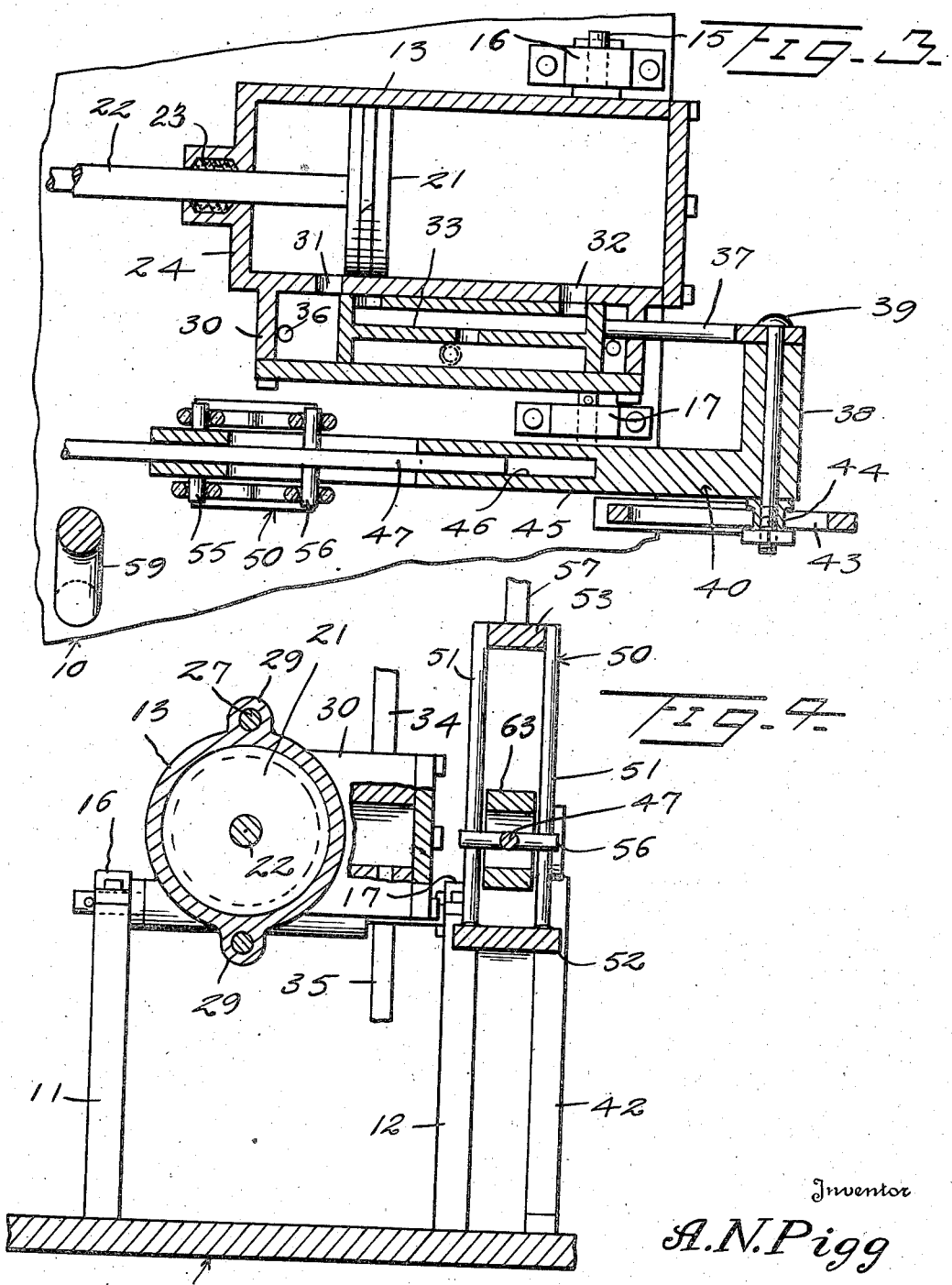

Patented Nov. 9, 1948

2,453,640

UNITED STATES PATENT OFFICE 2,453,640

VALVE ACTUATION FOR OSCILLATING CYLINDER EXPANSIBLE CHAMBER MOTORS

Archie N. Pigg, Ferndale, Mich.

Application September 12, 1947, Serial No. 773,587

2 Claims. (Cl. 121—63)

This invention relates to steam engines of the oscillatable cylinder type.

An object of this invention is to provide an improved steam engine having a rockable or oscillatable cylinder, and an improved valve construction therefor.

Another object of this invention is to provide an oscillatable cylinder having a pair of opposed guides within which slide rods carried by the piston rod slidably engage, so that the piston will be relieved of any twisting or rocking strain caused by oscillation of the cylinder.

A further object of this invention is to provide an improved valve structure which includes means for adjusting the valve so as to provide for forward or rearward rotation of the crankshaft and to vary the engine speed.

A further object of this invention is to provide an oscillating engine construction of this kind which is of simple construction and embodies a minimum of parts.

With the above and other objects in view, my invention consists in the arrangement, combination and details of construction disclosed in the drawings and specification, and then more particularly pointed out in the appended claims.

In the drawings,

Figure 1 is a plan view of a steam engine constructed according to an embodiment of this invention, Figure 2 is a sectional view taken on the line 2—2 of Figure 1, Figure 3 is a fragmentary sectional view taken on the line 3—3 of Figure 2, Figure 4 is a fragmentary sectional view taken on the line 4—4 of Figure 2.

Referring to the drawings, the numeral 10 designates generally a base which has extending upwardly therefrom a pair of standards or bearing supporting members 11 and 12. A cylinder 13 is disposed between and extends upwardly from the standards 11 and 12, the cylinder 13 having secured to the lower portion thereof a rock shaft 15 which is journaled in bearings 16 and 17 carried by the upper ends of the standards 11 and 12 respectively.

A crankshaft 18 is disposed forwardly of the cylinder 13, being journaled in upstanding bearings 19 and 20 which are secured to and extend upwardly from the base 10. The cylinder 13 has slidable therein a piston 21 which has a connecting rod 22 fixed thereto and extending through a steam gland 23 carried by the inner head 24 of the cylinder. The connecting rod 22 is connected by means of a cap bearing 25 to the offset 26 of the crankshaft 18 and in order to provide for relief of any bending strain on the piston rod 22 during the vertical oscillation of the cylinder 13, I have provided a pair of parallel rods 27 which are secured to extensions 28 carried by the cap bearing 25.

The slide rods 27 are adapted to slide through guide members 29 formed on the upper and lower sides of the cylinder 13 so that the slide rods 27 will bear substantially all of the bending strain caused by turning of the crankshaft 18 and the oscillation of the cylinder 13. The cylinder 13 has extending from one side thereof a steam chest 30 and the cylinder 13 is formed with spaced ports 31 and 32, communicating with the steam chest so that steam may be discharged into and exhausted from the opposite sides of the piston 21 during the reciprocation of the piston.

The steam chest 30 has slidable therein a slide valve 33 which regulates the opening and closing of the ports 31 and 32. A steam intake pipe 34 is connected to and extends forwardly from the steam chest 30 and is adapted to be connected by means of a flexible hose or the like to a source of steam pressure. The exhaust pipe 35 extends from the lower side of the steam chest so that the steam may be exhausted from the exhaust ports 36 formed in the lower side of the steam chest, the ports 36 being in communication with the exhaust 35.

The valve 33 is adapted to be reciprocated in proper timed relation with respect to the reciprocation of the piston 21 and the oscillation of the cylinder 13 by means of a valve rod 37 which is rockably secured to an inwardly projecting arm 38 by means of a bolt 39.

The arm 38 is formed as an integral part of an elongated cam engaging rod generally designated as 40. The rear or outer end of the rod 40 is slidably supported on a guide 41 carried by an upstanding bracket arm 42 fixed relative to the base 10. The guide 41 is formed with an elongated horizontal slot 43 within which a roller 44 mounted on the bolt 39 engages. The cam engaging rod 40 includes a rear rod member 45 formed with an axial bore 46 within which an elongated valve adjusting rod 47 loosely engages.

The rod 47 extends forwardly and has secured thereto a bearing cap 48 which engages about an eccentric 49 secured to the crankshaft 18 at one side of the offset 26. The length of the valve operating rod 40 is adjusted to provide for forward, reverse, or regulated speed operation by means of an adjustable yoke 50. The yoke 50 is formed of two pairs of upwardly divergent bars 51 which are secured at the lower ends to a connecting bar 52, and at their upper ends to a connecting bar 53. Outer pairs of bars 54 are disposed in parallel relation with the bars 51 and a pin 55, fixed relative to the rear rod member 45, engages through the forward pairs of rods 51 and 54, and a second pin 56 attached to the valve adjusting rod 47 engages between the rear pairs of rods 51 and 52. Vertical movement or adjustment of the yoke 50 will provide for moving the pins 55 and 56 toward or away from each other, and in this manner the valve 33 can be adjusted to provide for forward, reverse, or other regulated operation of the valve 33.

The yoke 50 has extending upwardly therefrom an arm 57 which is pivotally connected to a yoke adjusting lever 58. The lever 58 is rockably mounted on the upper end of a supporting bar 59, and a quadrant or toothed rack 60 is fixed relative to the supporting member 59 and is engaged by a spring-pressed pawl 61 carried by the lever 58.

In the use and operation of this engine the intake pipe 34 is connected to a source of steam pressure through the medium of a flexible hose. The valve 33 is adjusted by rocking of the lever 58 so that the piston 21 will start its reciprocation in the proper direction. As the piston 21 reciprocates within the cylinder 13, the latter will oscillate or rock on the bearings 16. As cylinder 13 oscillates, valve 33 will be reciprocated in proper timed relation by means of the cam 49. The pin 55 which is disposed at the forward end of the rod 45 is carried by a sleeve 62 which is supported in forward spaced relation to the rod or bar 45 by means of a pair of spaced parallel arms 63, as shown in Figure 2.

I do not mean to confine myself to the exact details of construction herein disclosed, but claim all variations falling within the purview of the appended claims.

What I claim is:

1. A steam engine comprising a base, a cylinder, means rockably mounting said cylinder on said base, a crankshaft rotatably carried by said base, a piston slidable in said cylinder, a piston rod connecting said piston with said crankshaft, a pair of slide rods fixed in parallel relation to said piston rod, a pair of guides for said slide rods carried by said cylinder, a steam chest carried by said cylinder, a valve slidable in said steam chest, a valve shifting rod connected at one end to said valve, a valve operating cam on said crankshaft, said valve shifting rod including a pair of telescoping rod members, and means adjusting said rod members relative to each other to thereby vary the valve position.

2. A steam engine comprising a base, a cylinder, means rockably mounting said cylinder on said base, a crankshaft rotatably carried by said base, a piston slidable in said cylinder, a piston rod connecting said piston with said crankshaft, a pair of slide rods fixed in parallel relation to said piston rod, a pair of guides for said slide rods carried by said cylinder, a steam chest carried by said cylinder, a valve slidable in said steam chest, a valve shifting rod connected at one end to said valve, a valve operating cam on said crankshaft, said valve shifting rod comprising a pair of aligned rod members, means slidably connecting said members together, a transversely disposed pin carried by one rod member, a second transversely disposed pin carried by the other rod member, a V-shaped adjusting member engaging said pins, and an adjusting lever pivotally secured to said V-shaped member, vertical adjustment of said adjusting member effecting adjustment of said valve to thereby provide for forward or reverse operation of said crankshaft.

ARCHIE N. PIGG.

REFERENCES CITED

The following references are of record in the file of this patent:

UNITED STATES PATENTS

| Number | Name | Date |
|---|---|---|
| 127,928 | Sellers | June 11, 1872 |
| 155,303 | Hemenway | Sept. 22, 1874 |